United States Patent [19]

Nakajima

[11] Patent Number: 4,921,331
[45] Date of Patent: * May 1, 1990

[54] MULTI-LAYERED MIRROR

[75] Inventor: Yuji Nakajima, Tokyo, Japan

[73] Assignee: Hoya Corporation, Tokyo, Japan

[*] Notice: The portion of the term of this patent subsequent to Feb. 21, 2006 has been disclaimed.

[21] Appl. No.: 138,108

[22] Filed: Dec. 28, 1987

[30] Foreign Application Priority Data

Dec. 27, 1986 [JP] Japan .................. 61-309112

[51] Int. Cl.$^5$ .................. G02B 5/08; G02B 5/28
[52] U.S. Cl. .................. 350/164; 350/278; 350/642
[58] Field of Search ............ 350/164, 600, 166, 642, 350/278, 276 R, 276 SL; 428/333

[56] References Cited

U.S. PATENT DOCUMENTS

| | | | |
|---|---|---|---|
| 2,381,728 | 8/1945 | Dimmick | 350/164 |
| 3,432,225 | 3/1969 | Rock | 350/164 |
| 4,805,989 | 2/1989 | Nakajima | 350/164 |

FOREIGN PATENT DOCUMENTS 62-39801  2/1987  Japan .................. 350/600

Primary Examiner—Bruce Y. Arnold
Assistant Examiner—Terry S. Callaghan
Attorney, Agent, or Firm—Sughrue, Mion, Zinn, Macpeak & Seas

[57] ABSTRACT

An improved mirror of a type especially advantageous for use as a rearview mirror for automotive applications. The inventive mirror employs a dielectric multi-layered coating formed on the front side of a glass or plastic transparent substrate, the back side of which is provided with a light-absorbing layer. The dielectric coating is composed of three to six dielectric layers laminated one on top of another and having alternately differing refractive indices. At least one of the laminated dielectric layers has an optical thickness of $\lambda_0/2$, where $\lambda_0$ is a wavelength of light used as a reference for design purposes and which is in a range of 500 to 580 nm for an incident angle of 0°, with each of the remaining dielectric layers having a thickness of $\lambda_0/4$.

16 Claims, 9 Drawing Sheets (1) SPECTRAL LUMINOUS EFFECIENCY FOR DARK ADAPTATION V'($\lambda$)
(2) SPECTRAL ENERGY OF HALOGEN LAMP P($\lambda$)
(3) HALOGEN HEADLAMP INTENSITY AS PERCEPTIVED BY THE HUMAN EYES P($\lambda$) x V'($\lambda$)

4,921,331

MULTI-LAYERED MIRROR

BACKGROUND OF THE INVENTION

The present invention relates to a mirror, and more particularly, to a multi-layered surface mirror having superior properties in terms of such aspects as freedom from glare, visibility and decorative finish.

The multi-layered surface mirror of the present invention is useful in such applications as automotive rearview mirrors, mirrors with a convex surface used for warning drivers against hazards in the road ahead, and ornamental mirrors.

Conventional mirrors such as automotive rearview mirrors are generally composed of a glass substrate coated on its back side with a coating of a metal such as aluminum or chromium, which is further overlaid with a protective coating.

Multi-layered back reflecting mirrors have recently been marketed. Such mirrors are composed of a glass substrate having a dielectric multi-layered coating on its back side and which is overlaid with a black light-absorbing coating. Multi-layered surface mirrors have also been proposed to be composed of a glass substrate having a dielectric multi-layered coating on its front side and a black light-absorbing coating on the back side. In the mirror of the former type, an example of which is disclosed in Unexamined Published Japanese Patent Application No. 144504/1982, the dielectric multi-layered coating in composed of five alternating films of $TiO_2$ and $SiO_2$ that have optical thickness of $\lambda/4$ or $3\lambda/4$, or a combination of such layer. Another example of a multi-layered back reflecting mirror is disclosed in Unexamined Published Japanese Patent Application No. 98405/1985 explaying dielectric multi-layered coating having four alternating films of $TiO_2$ and $SiO_2$, each having an optical thickness of $n\lambda/4$ (where n is an odd number). An example of a surface reflecting mirror of the second type employs a three-layered dielectric coating of $TiO_2$—$SiO_2$—$TiO_2$, each layer having an optical thickness of $\lambda/4$. Commercial products of this type of mirror are believed to have been manufactured in West Germany.

The above-described prior art mirrors have spectral reflection characteristics as shown in FIG. 4, in which curve (a) refers to an aluminum mirror. As curve (a) shows, the aluminum mirror has a high reflectance (80 to 90%) and flat reflection characteristics which are not dependent upon wavelength. If this aluminum mirror is used as a rearview mirror in an automobile, it causes strong reflection of the light flux from the headlights of a following vehicle, which leads to eye fatigue because of the glare caused by the reflected light.

The spectral reflection characteristics of the prior art chromium mirror are shown by curve (b) in FIG. 4. As curve (b) shows, the chromium mirror has a low reflectance (38-50%) and exhibits a certain degree of freedom from glare compared with the higher reflectance aluminum mirror. However, the glareless property of the chromium mirror is not as high as it might be expected to be because of the flat spectral characteristics of the mirror. In addition, the visibility of the chromium mirror is rather poor.

The dielectric multi-layered back reflecting mirrors disclosed in Unexamined Published Japanese Patent Application Nos. 144504/1982 and 98405/1985 have spectral reflection characteristics as shown by curves (c) and (d), respectively, in FIG. 4. These spectral reflection characteristics are similar to those of a commercial multi-layered surface reflecting mirror shown by curve (e) in FIG. 4. In general, the visibility of these mirrors and their freedom from glare are not satisfactory for the same reasons as noted below for the commercial multi-layered surface reflecting mirror. Furthermore, these mirrors which are of the back reflecting type, produce reflection from the front surface of glass and the resulting image overlap impairs resolution.

A known commercial multi-layered surface reflecting mirror is composed of a glass substrate that has a three-layered ($TiO_2$—$SiO_2$—$TiO_2$) coating former on the front side and a light-absorbing coating on the back side. The optical thickness of each layer of the coating is $\lambda/4$. This three-layered mirror has spectral reflection characteristics as shown by curve (e) in FIG. 4. The mirror has a reflectance of 48% and satisfies the reflectance requirement specified in JIS (Japanese Industrial Standard) D 5705 "Automotive Mirror System" for a minimum reflectance of 38% for the chromium mirror. However, as is clear from curve (e) in FIGS. 4, the reflectance of this mirror peaks in the range of 430–550 nm and drops sharply in the longer ranges up to 700 nm, causing the mirror to reflect bluish light. As a result, the color balance provided by the mirror is disturbed in such a way that reds are particularly difficult to recognized. Thus, the visibility of the mirror is impaired.

The spectral luminous efficiency $V'(\lambda)$ of the human eye, the spectral energy characteristics $P(\lambda)$ of a headlight of an automobile, and the product of $P(\lambda) \times V'(\lambda)$ are shown by three different curves in FIG. 5. As these curves show, the response of a driver's eyes to the headlights of a closely following vehicle at night is highest at a wavelength between 480 and 550 nm. Since this range coincides with the region where the peak of the spectral reflectance curve (e) in FIG. 4 occurs, the ability of the commercial three-layered mirror and other conventional surface reflecting mirrors to prevent glare from the headlights of a following vehicle at night is not as high as desired.

SUMMARY OF THE INVENTION

An object, therefore, of the present invention is to solve the aforementioned problems of the prior art mirrors, in particular, multi-layered surface type mirrors, and to provide a multi-layered mirror having improved properties in such aspects as freedom from glare, visibility and decorative finish.

The present inventors conducted various studies on the composition of a dielectric multi-layered coating to be formed on the front side of a glass or plastic transparent substrate the backside of which is to be provided with a light-absorbing layer so as to prepare a multi-layered surface reflecting mirror. The preferred dielectric multi-layered coating finally produced by the inventors was composed of 3 to 6 dielectric layers laminated one on top of another having alternately differing refractive indices, and at least one of these laminated dielectric layers had an optical thickness of $\lambda_0/2$ ($\lambda_0$ is the wavelength of light to be used as the reference for design purposes and is desirably set in the range of 500 to 580 nm for an incident angle of 0°), with each of the remaining dielectric layers having an optical thickness of $\lambda_0/4$. The present inventors found that a dielectric multi-layered coating having this composition has a greater degree of freedom from glare since the reflectance in the range of 480 to 550 nm where high spectral luminous efficiency for dark adaptation occurs was reduced. It was also found that this dielectric multi-layered coating offered an improved level of visibility since the reflectances in the ranges of 430 to 480 nm and 580 to 750 nm for blue and red colors, respectively, to which the human eye is less sensitive than the other primary color (green) were increased. The present invention has been accomplished on the basis of these findings.

The present invention provides a multi-layered mirror having a dielectric multi-layered coating on the front side of a glass or plastic transparent substrate and a light-absorbing layer formed on the back side of the same substrate, the dielectric multi-layered coating being composed of 3 to 6 dielectric layers laminated one on top of another having alternately differing refractive indices, at least one of these dielectric layers having an optical thickness of $\lambda_0/2$ ($\lambda_0$ is the wavelength of light used as the reference measurement for design purposes) and each of the remaining dielectric layers having an optical thickness of $\lambda_0/4$.

DESCRIPTION OF THE PREFERRED EMBODIMENTS

Figure 1A:
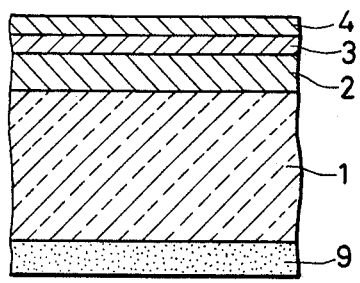
FIGS. 1, 2 and 3 are each a set of cross-sectional views showing on an enlarged scale the essential part of multi-layered surface reflecting mirrors according to various embodiments of the present invention.

The present invention will hereinafter be described in detail with further reference to the accompanying drawings.

As already discussed, the dielectric multi-layered coating in the multi-layered mirror of the present invention is composed of 3 to 6 dielectric layers in a laminated relationship having alternately differing refractive indices. In a particularly preferred embodiment, the dielectric coating is composed of layers of a material having a high refractive index (1.9 to 2.4) that alternate with layers of material having a low refractive index (1.3 to 1.8), for a total number of layers of 3 to 5. Each of the layers of a material having a high refractive index is formed of one or more materials having a high refractive index, and each of the layers of a material having a low refractive index is also formed of one or more materials having a low refractive index. Illustrative materials having a high refractive index include oxides such as $TiO_2$, $Ta_2O_5$, $ZrO_2$, $CeO_2$, $HfO_2$ and $La_2O_3$, sulfides such as ZnS, and mixtures thereof. Illustrative materials having a low refractive index include $MgF_2$, $SiO_2$, $CeF_3$, and $Al_2O_3$ and mixtures thereof.

Referring to the thickness of the dielectric layers of which the dielectric multi-layered coating is made, it is essential for the purposes of the present invention that at least one of the dielectric layers have an optical thickness of $\lambda_0/2$, with each of the remaining layers having an optical thickness of $\lambda_0/4$. If layers of a material having a high refractive index alternate with layers of a material having a low refractive index in such a way that each of the layers has an optical thickness of $\lambda_0/4$, the light reflected from one interface between layers will interfere with the light reflected from another interface and the resulting amplification effect produces spectral reflection characteristics in which a maximum reflectance occurs at $\lambda_0$. If, on the other hand, alternating layers having individual optical thicknesses of $\lambda_0/4$ are interleaved with a layer having an optical thickness of $\lambda_0/2$, spectral reflection characteristics are attained in which the reflectance at or near $\lambda_0$ is comparatively lower than the values in the shorter and longer wavelength ranges.

During commercial production of the multi-layered mirror of the present invention, the thickness of the layers in the dielectric multi-layered coating that are ideally to have an optical thickness of $\lambda_0/4$ should be controlled over the range of $\lambda_0/4 \times 0.8$ to $\lambda_0/4 \times 1.2$, and the layers that are to ideally have an optical thickness of $\lambda_0/2$ should be controlled over the range of $\lambda_0/2 \times 0.8$ to $\lambda_0/2 \times 1.2$. The individual dielectric layers may be formed by various methods including physical coating techniques such as evaporation, sputtering and ion plating, chemical vapor deposition (CVD) techniques, and thin-film forming techniques such as one employing an organic coating solution.

The following are particularly preferred layer compositions for the multi-layered dielectric coating which is to be formed on the front side of a transparent substrate in the multi-layered mirror of the present invention.

(I) When the multi-layered dielectric coating is composed of three layers:
  (i) transparent substrate-2H layer-L layer-H layer
  (ii) transparent substrate-H layer-L layer-2H layer (II) When the multi-layered dielectric coating is composed of four layers:
  (i) transparent substrate-L layer-2H layer-L layer-H layer
  (ii) transparent substrate-2L layer-2H layer-L layer-H layer
  (iii) transparent substrate-L layer-H layer-L layer-2H layer (III) When the multi-layered dielectric coating is composed of five layers:
  (i) transparent substrate-2H layer-L layer-H layer-L layer-H layer
  (ii) transparent substrate-H layer-2L layer-H layer-L layer-H layer
  (iii) transparent substrate-H layer-L layer-H layer-L layer-2H layer.

In (I), (II) and (III) above, the H layer signifies a high-refractive index film with an optical thickness of $\lambda_0/4$ which is made of a material having a high refractive index of 1.9 to 2.4, the 2H layer signifies a high-refractive index film with an optical thickness of $\lambda_0/2$ which is made of a material having a high refractive index of 1.9 to 2.4, the L layer signifies a low-refractive index film with an optical thickness of $\lambda_0/4$ which is made of a material having a low refractive index of 1.3 to 1.8, and the 2L layer signifies a low-refractive index film with an optical thickness of $\lambda_0/2$ which is made of a material having a low refractive index of 1.3 to 1.8. The 2H layer may be the combination of a high-refractive index film ($H_1$ layer) with an optical thickness of $\lambda_0/4$ made of one high-refractive index material and another high-refractive index film (H$_2$) with an optical thickness of $\lambda_0/4$ that is made of another high-refractive index material as shown in FIGS. 1a, 1b, 2c and 3a. In a similar manner, the 2L layer may be the combination of a low-refractive index film (L$_1$ layer) with an optical thickness of $\lambda_0/4$ that is made of one low-refractive index material and another low-refractive index film (L$_2$ layer) with an optical thickness of $\lambda_0/4$ that is made of another low-refractive index material as shown in FIG. 3b.

The multi-layered mirror of the present invention employs glass or plastic as the material of the transparent substrate on which the dielectric multi-layered coating is formed. Glass is a particularly preferable substrate material. The light-absorbing layer formed on the back side of the transparent substrate is preferably of a black color.

The following examples are given for the purpose of further illustrating the preferred embodiments of the present invention, but are in no way to be taken to limit the same.

EXAMPLE 1

FIG. 1(A) is a cross-sectional view showing on an enlarged scale the essential part of a mirror constructed according to a preferred embodiment of the present invention in which the dielectric coating is composed of three layers. In this figure, 1 is a glass substrate, 2 is a high-refractive index layer (2H layer) made of TiO$_2$ and which has an optical thickness of $\lambda_0/2$ (270 nm), 3 is a low-refractive index layer (L layer) made of MgF$_2$ and which has an optical thickness of $\lambda_0/4$ (140 nm), 4 is a high-refractive index layer (H layer) made of TiO$_2$ and which has an optical thickness of $\lambda_0/4$ (140 nm), and 9 is a black light-absorbing layer.

Figure 6:
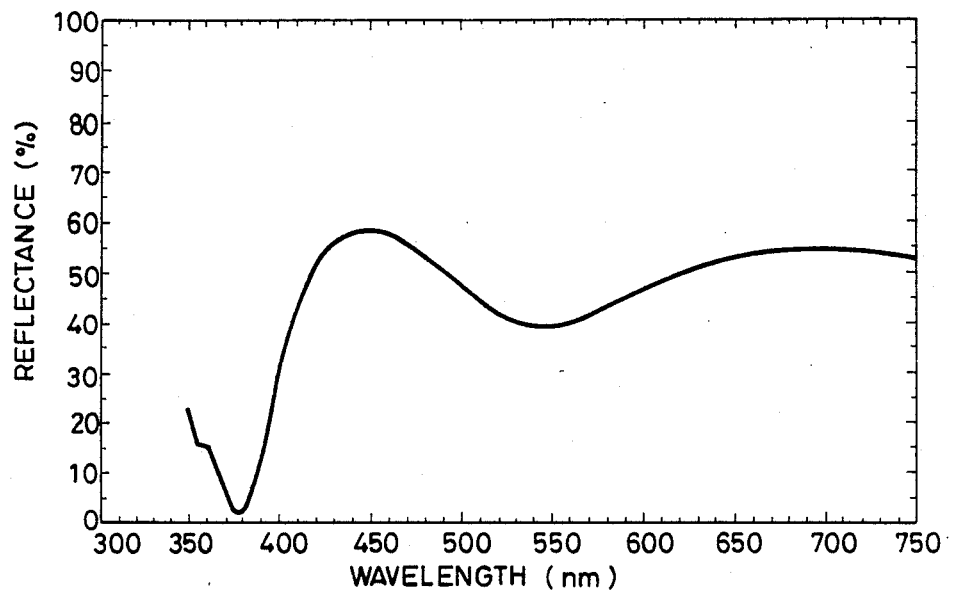
FIGS. 6 to 16 are spectral reflection characteristic diagrams for reflector mirrors according to various embodiments of the present invention.

Thus, the multi-layered mirror of Example 1 has a dielectric multi-layered coating formed on the front side of the glass substrate composed, in order from the substrate side, of a 2H layer, an L layer and an H layer, with the black light-absorbing layer being coated on the back side of the glass substrate. The spectral reflection characteristics of the resulting multi-layered mirror are shown in FIG. 6, from which one can see the following: Compared with the conventional multi-layered mirror, the mirror of Example 1 has a greater degree of freedom from glare since the reflectance in the range of 480 to 550 nm, having a high value of the product of spectral luminous efficiency for dark adaptation and the spectral energy of a headlight, is reduced. Secondly, the visibility of the inventive mirror is increased since the reflectances in the ranges of 430 to 480 nm and 580 to 700 nm for blue and red, respectively, for which the human eye is less sensitive than for green, are increased.

EXAMPLE 2

Figure 1B:
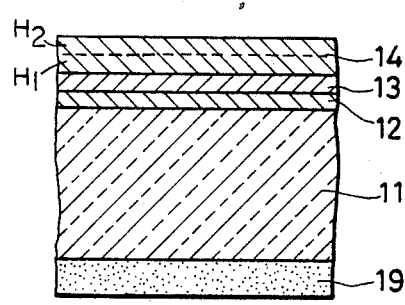
Figure 7:
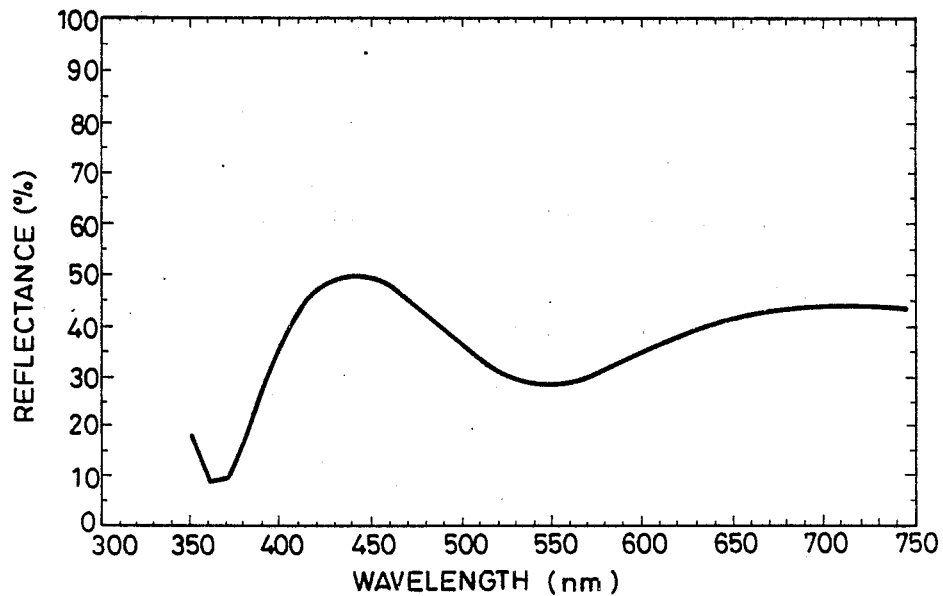

A mirror of the type shown in FIG. 1(B) was fabricated by forming a light-absorbing layer 19 on the back side of a glass substrate 11 and a three-layered dielectric coating on the front side of the substrate. The dielectric coating was composed, in order from the substrate side, of an H layer 12 (TiO$_2$, $\lambda_0/4=135$ nm), an L layer 13 (MgF$_2$, $\lambda_0/4=135$ nm) and an H$_1$+H$_2$ combination layer 14 (H$_1$=TiO$_2$, $\lambda_0/4=135$ nm; H$_2$=La$_2$O$_3$, $\lambda_0/4=135$ nm) equivalent to a 2H layer ($\lambda_0/2$). The spectral reflection characteristics of this mirror are shown in FIG. 7, from which one can see the great freedom from glare of the mirror of Example 2, as well as its high visibility.

EXAMPLE 3

Figure 2A:
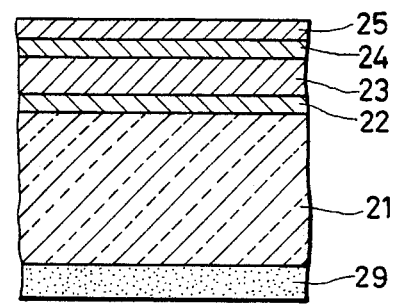
Figure 8:
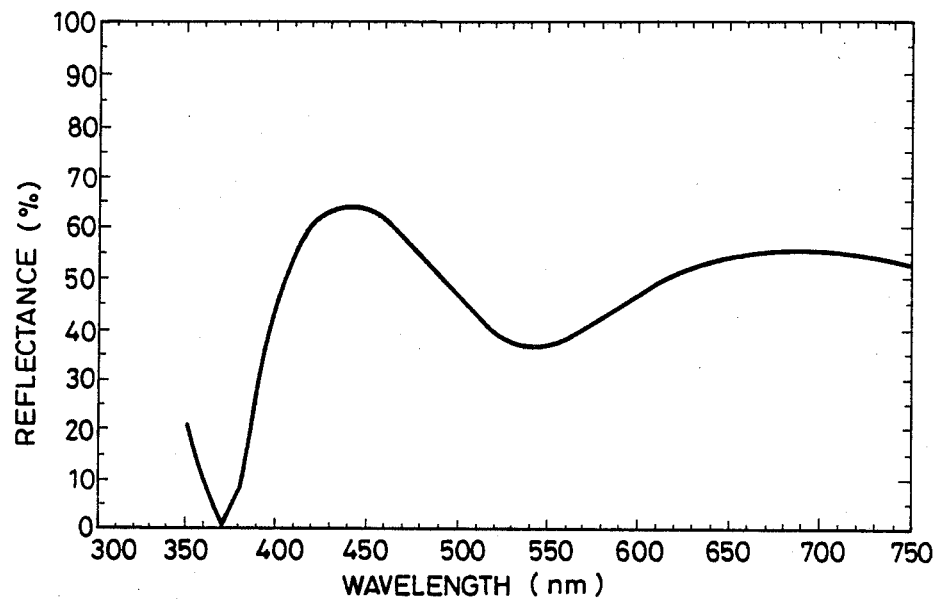

A mirror of the type shown in FIG. 2(A) was fabricated by forming a light-absorbing layer 29 on the back side of a glass substrate 21 and a four-layered dielectric coating on the front side of the substrate. The dielectric coating was composed, in order from the substrate side, of an L layer 22 (SiO$_2$, $\lambda_0/4=135$ nm), a 2H layer 23 (TiO$_2$, $\lambda_0/2=270$ nm), an L layer 24 (MgF$_2$, $\lambda_0/4=135$ nm) and an H layer 25 (TiO$_2$, $\lambda_0/4=135$ nm). The spectral reflection characteristics of this mirror are shown in FIG. 8, from which one can see the great freedom from glare of the mirror of Example 3, as well as its high visibility.

EXAMPLE 4

Figure 2B:
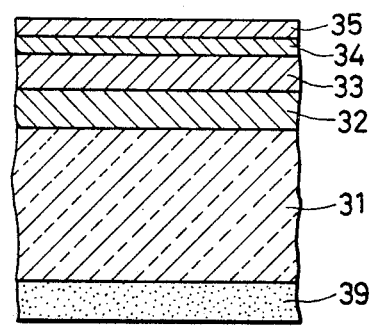
Figure 9:
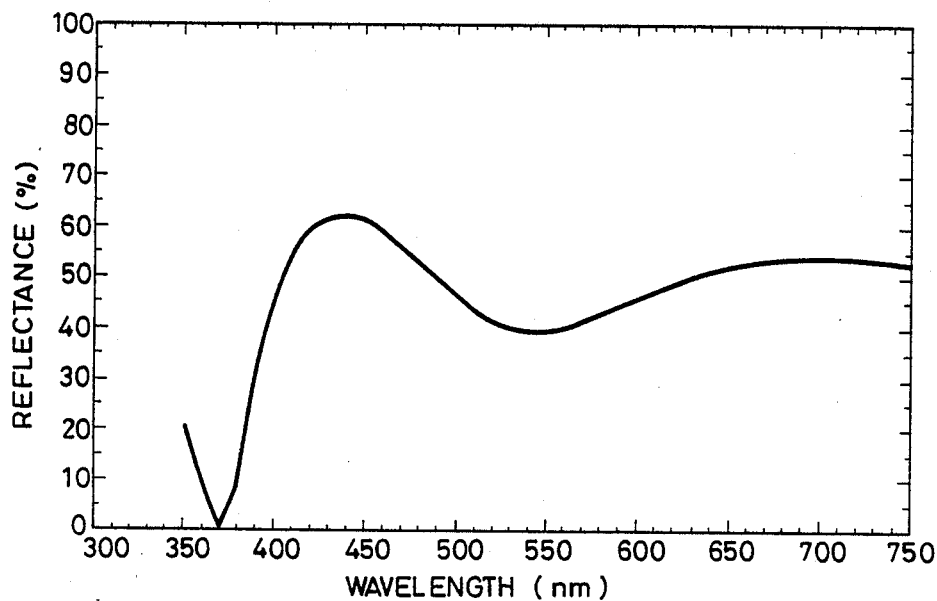

A mirror of the type shown in FIG. 2(B) was fabricated by forming a light-absorbing layer 39 on the back side of a glass substrate 31 and a four-layered dielectric coating on the front side of the substrate. The dielectric coating was composed, in order from the substrate side, of a 2L layer 32 (SiO$_2$, $\lambda_0/2=270$ nm), a 2H layer 33 (TiO$_2$, $\lambda_0/2=270$ nm), an L layer 34 (MgF$_2$, $\lambda_0/4=135$ nm) and an H layer 35 (TiO$_2$, $\lambda_0/4=135$ nm). The spectral reflection characteristics of this mirror are shown in FIG. 9, from which one can see the great freedom from glare of the mirror of Example 4, as well as its high visibility.

EXAMPLE 5

Figure 2C:
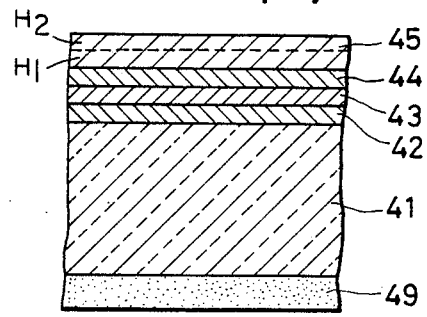
Figure 10:
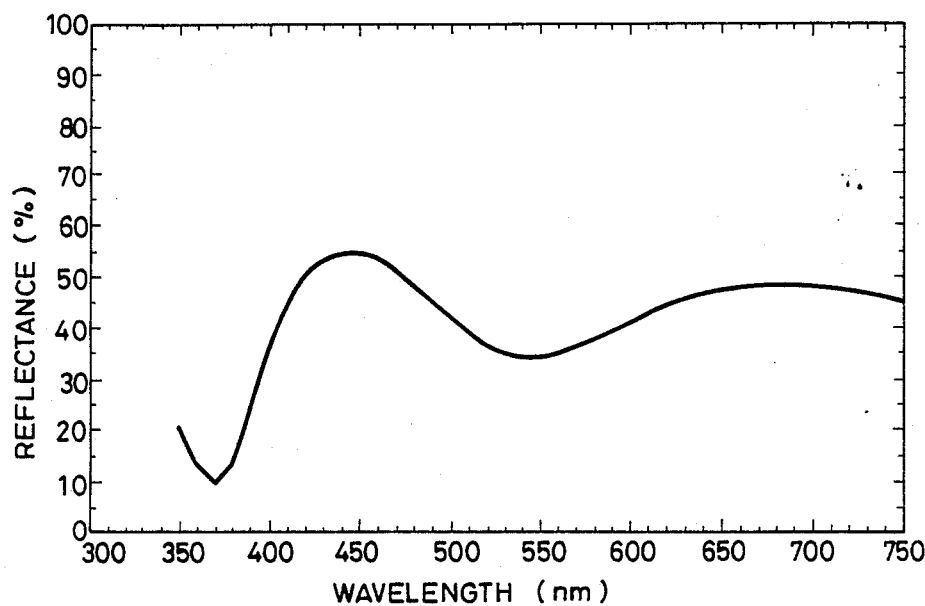

A mirror of the type shown in FIG. 2(C) was fabricated by forming a light-absorbing layer 49 on the back side of a glass substrate 41 and a four-layered dielectric coating on the front side of the substrate. The dielectric coating was composed, in order from the substrate side, of an L layer 42 (MgF$_2$, $\lambda_0/4=135$ nm), an H layer 43 (TiO$_2$, $\lambda_0/4=135$ nm), an L layer 44 (MgF$_2$, $\lambda_0/4=135$ nm), and an H$_1$+H$_2$ combination layer 45 (H$_1$=TiO$_2$, $\lambda_0/4=135$ nm; H$_2$=La$_2$O$_3$, $\lambda_0/4=135$ nm) equivalent to a 2H layer ($\lambda_0/2$). The spectral reflection characteristics of this mirror are shown in FIG. 10, from which one can see the great freedom from glare of the mirror of Example 5, as well as its high visibility.

EXAMPLE 6

Figure 3A:
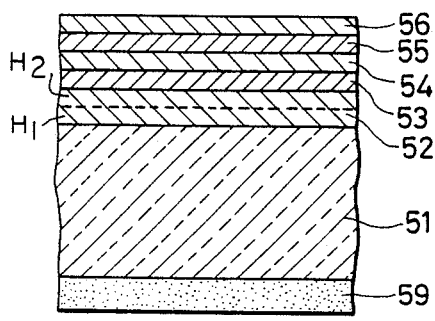
Figure 11:
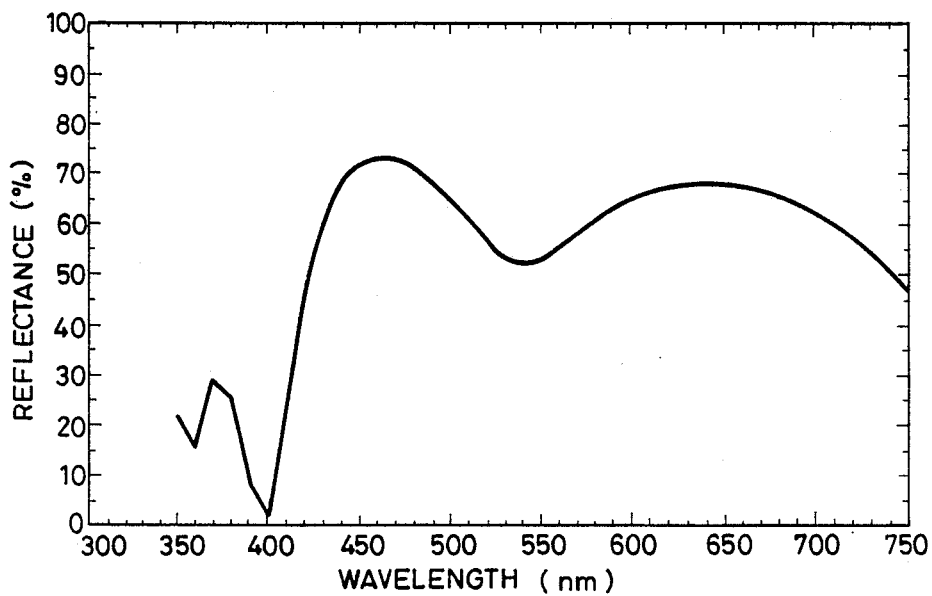

A mirror of the type shown in FIG. 3(A) was fabricated by forming a light-absorbing layer 59 on the back side of a glass substrate 51 and a five-layered dielectric coating on the front side of the substrate. The dielectric coating was composed, in order from the substrate side, of an H$_1$+H$_2$ combination layer 52 (H$_1$=TiO$_2$, $\lambda_0/4=135$ nm; H$_2$=La$_2$O$_3$, $\lambda_0/4=135$ nm) equivalent to a 2H layer ($\lambda_0/2$), an L layer 53 (SiO$_2$, $\lambda_0/4=135$ nm), an H layer 54 (TiO$_2$, $\lambda_0/4=135$ nm), L layer 55 (SiO$_2$, $\lambda_0/4=135$ nm) and an H layer 56 (TiO$_2$, $\lambda_0/4=135$ nm). The spectral reflection characteristics of this mirror are shown in FIG. 11, from which one can see the great freedom from glare of the mirror of Example 6, as well as its high visibility.

EXAMPLE 7

Figure 12:
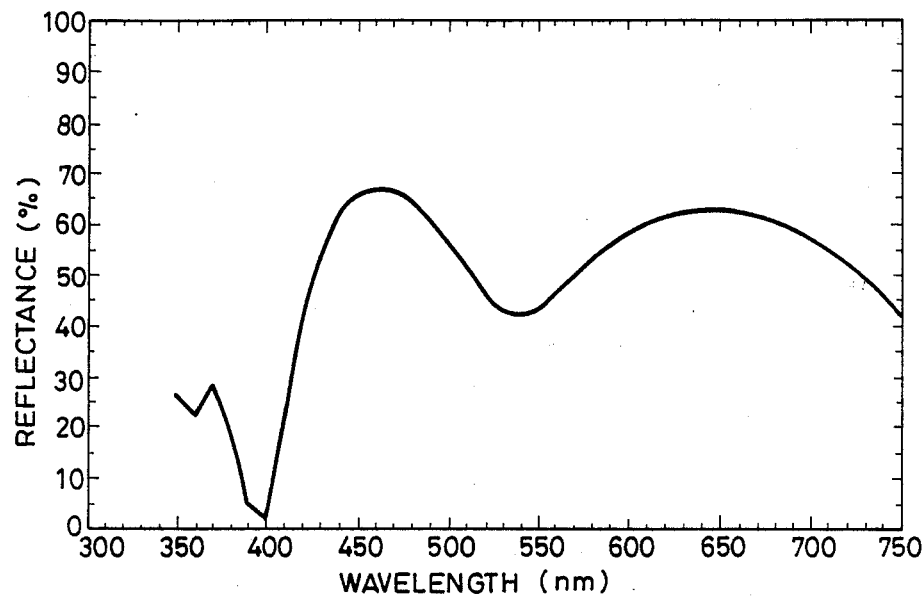

A mirror of the type shown in FIG. 3(A) was fabricated by forming a light-absorbing layer 59 on the back side of a glass substrate 51 and a five-layered dielectric coating on the front side of the substrate. The dielectric coating was composed, in order from the substrate side, of an H$_1$+H$_2$ combination layer 52 (H$_1$=TiO$_2$, $\lambda_0/4=135$ nm; H$_2$=La$_2$O$_3$, $\lambda_0/4=135$ nm) equivalent to a 2H layer ($\lambda_0/2$), an L layer 53 (SiO$_2$, $\lambda_0/4=135$ nm), an H layer 54 (ZrO$_2$, $\lambda_0/4=135$ nm), L layer 55 (SiO$_2$, $\lambda_0/4=135$ nm) and an H layer 56 (TiO$_2$, $\lambda_0/4=135$ nm). The spectral reflection characteristics of this mirror are shown in FIG. 12, from which one can see the great freedom from glare of the mirror of Example 7, as well as its high visibility.

EXAMPLE 8

Figure 13:
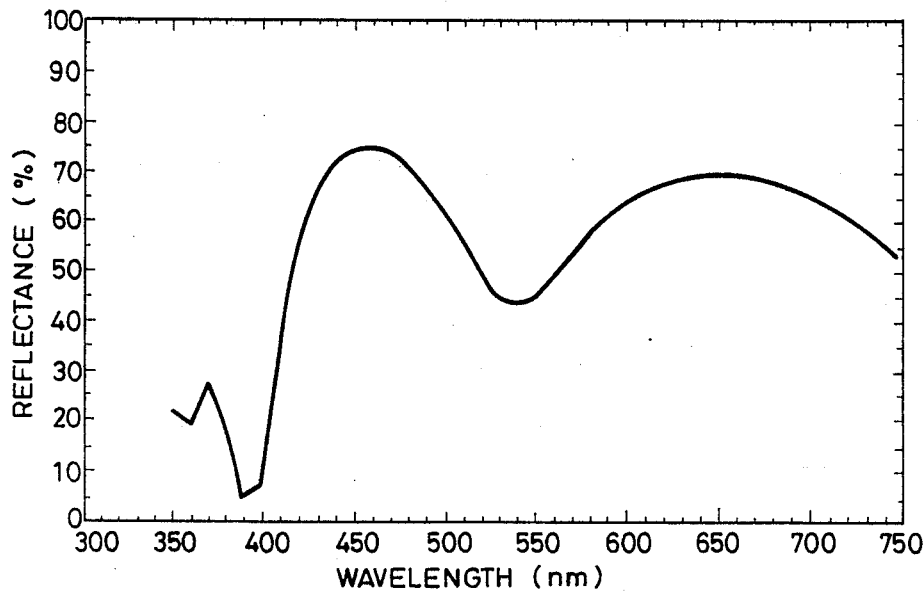

A mirror of the type shown in FIG. 3(B) was fabricated by forming a light-absorbing layer 69 on the back side of a glass substrate 61 and a five-layered dielectric coating on the front side of the substrate. The dielectric coating was composed, in order from the substrate side, of an H layer 62 (TiO$_2$, $\lambda_0/4=135$ nm), an L$_1$+L$_2$ combination layer 63 (L$_1$=Al$_2$O$_3$, $\lambda_0/4=135$ nm; L$_2$=SiO$_2$, $\lambda_0/4=135$ nm) equivalent to a 2L layer ($\lambda_0/2$), an H layer 64 (TiO$_2$, $\lambda_0/4=135$ nm), an L layer 65 (SiO$_2$, $\lambda_0/4=135$ nm), and an H layer 66 (TiO$_2$, $\lambda_0/4=135$ nm). The spectral reflection characteristics of this mirror are shown in FIG. 13, from which one can see the great freedom from glare of the mirror of Example 8, as well as its high visibility.

EXAMPLE 9

Figure 3C:
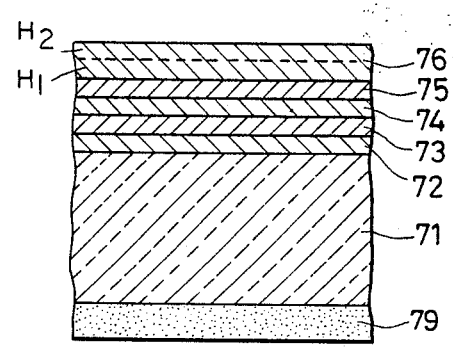
Figure 3B:
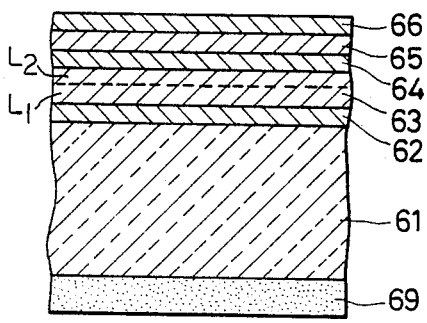
Figure 14:
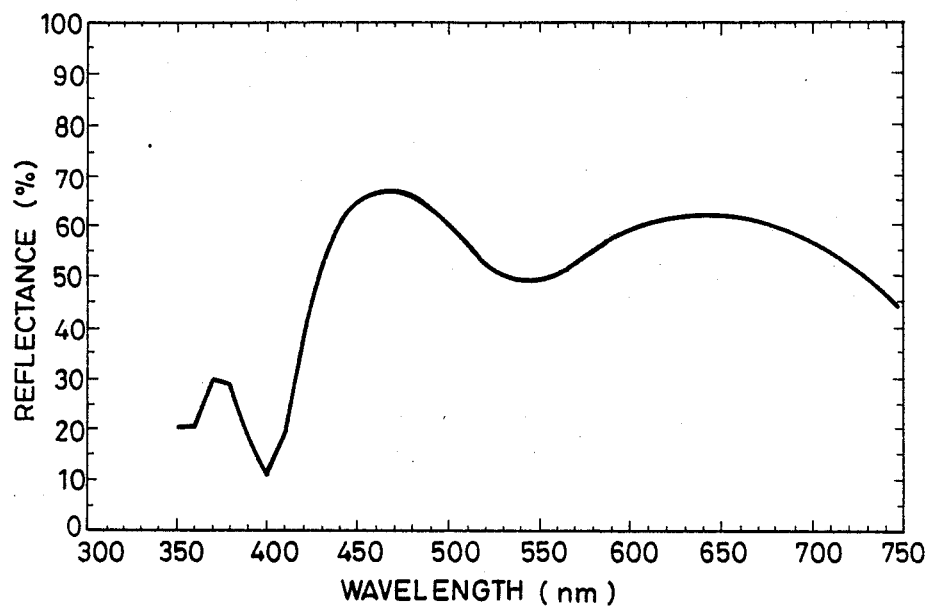

A mirror of the type shown in FIG. 3(C) was fabricated by forming a light-absorbing layer 79 on the back side of a glass substrate 71 and a five-layered dielectric coating on the front side of the substrate. The dielectric coating was composed, in order from the substrate side, of an H layer 72 (TiO$_2$, $\lambda_0/4=135$ nm), an L layer 73 (SiO$_2$, $\lambda_0/4=135$ nm), an H layer 74 (TiO$_2$, $\lambda_0/4=135$ nm), an L layer 75 (SiO$_2$, $\lambda_0/4=135$ nm), and an H$_1$+H$_2$ combination layer 76 (H$_1$=TiO$_2$, $\lambda_0/4=135$ nm; H$_2$=ZrO$_2$, $\lambda_0/4=135$ nm) equivalent to a 2H layer ($\lambda_0/2$). The spectral reflection characteristics of this mirror are shown in FIG. 14, from which one can see the great freedom from glare of the mirror of Example 9, as well as its high visibility.

EXAMPLE 10

Figure 3D:
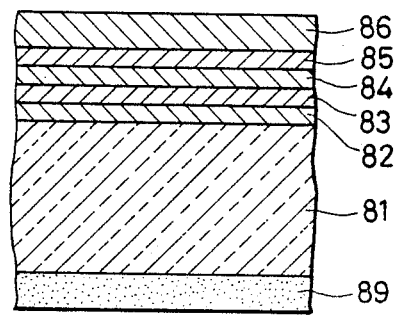
Figure 4:
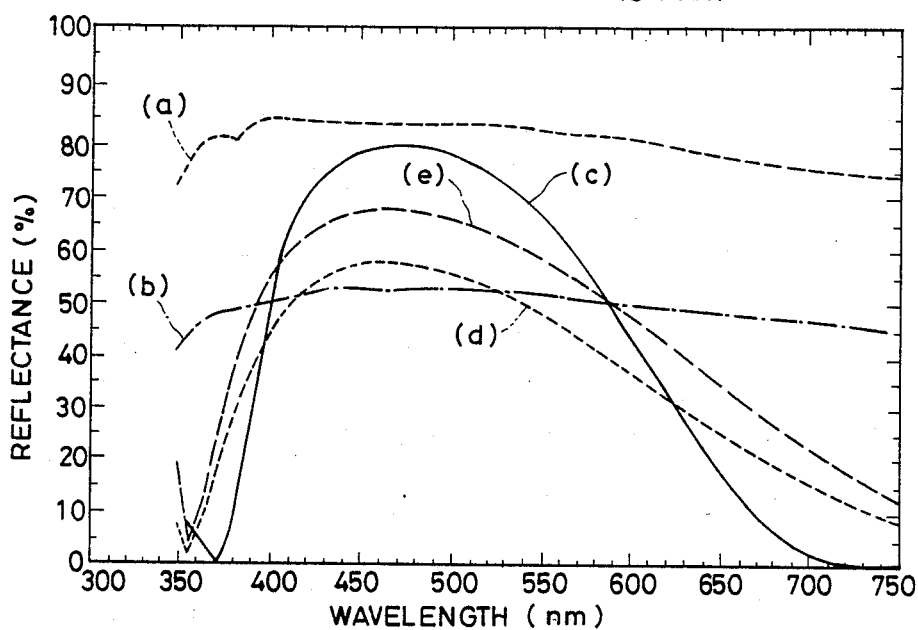
FIG. 4 is a graph showing the spectral reflection characteristics of different types of prior art reflector mirrors.
Figure 15:
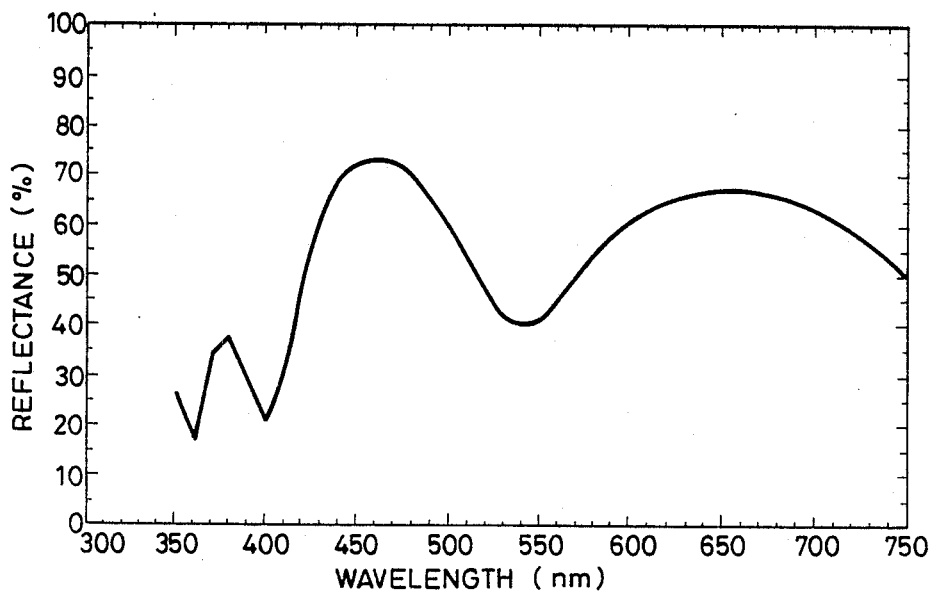

A mirror of the type shown in FIG. 3(D) was fabricated by forming a light-absorbing layer 89 on the back side of a glass substrate 81 and a five-layered dielectric coating on the front side of the substrate. The dielectric coating was composed, in order from the substrate side, of an H layer 82 (TiO$_2$, $\lambda_0/4=135$ nm), an L layer 83 (SiO$_2$, $\lambda_0/4=135$ nm), an H layer 84 (TiO$_2$, $\lambda_0/4=135$ nm), an L layer 85 (SiO$_2$, $\lambda_0/4=135$ nm), and a 2H layer 86 (TiO$_2$, $\lambda_0/2=270$ nm). The spectral reflection characteristics of this mirror are shown in FIG. 15 from which one can see the great freedom from glare of the mirror of Example 10, as well as its high visibility.

The multi-layered surface reflecting mirror of the present invention has the following technical advantages.

(i) The mirror has a great degree of freedom from glare.

Figure 5:
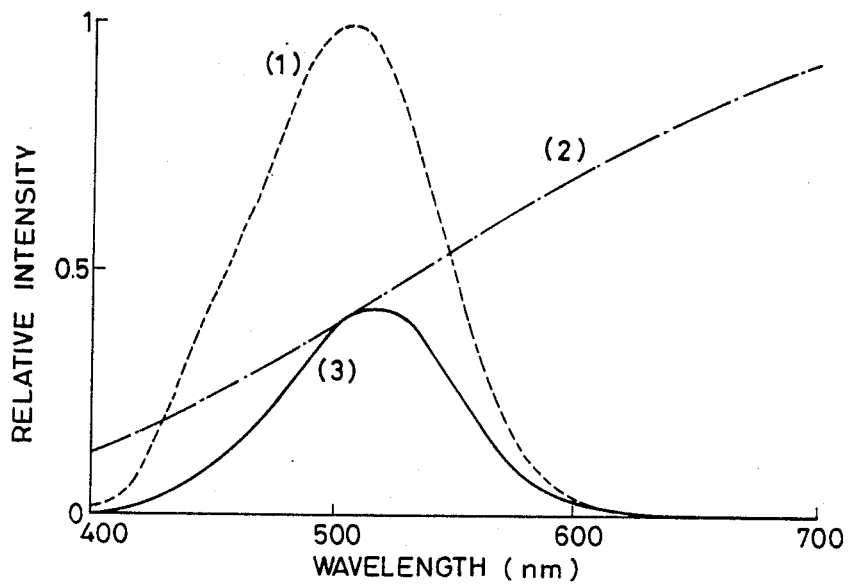
FIG. 5 is a graph showing the spectral energy characteristics of a headlight of an automobile, the spectral luminous efficiency for dark adaptation of the human eye, and the product of these two parameters, namely, the spectral energy characteristics of the headlight of an automobile as perceived by the human eye.

In the case of driving at night with the light of the headlamps of a following vehicle striking the mirror, the quantity of light flux reaching the driver's eyes after being reflected by the mirror is obtained by multiplying the intensity (power) of the light P ($\lambda$) (shown by curve (2) in FIG. 5) times the eye's response to power V'($\lambda$) (spectral luminous efficiency for dark adaptation) (shown by curve (1) in FIG. 5, the product of these two parameters, P($\lambda$)$\times$V'($\lambda$), is plotted by curve (3) in FIG. 5) further times the spectral reflectance of the mirror.

As is clearly evident from FIG. 5, in order to attain a greater degree of freedom from glare, it is important that the reflectance of the mirror have a small value in the wavelength region where P($\lambda$)$\times$V'($\lambda$) assumes a high value. As can be seen from FIGS. 6 to 15 the mirror of the present invention has a low reflectance in the range of 480 to 550 nm where P($\lambda$)$\times$V'($\lambda$) takes on a large value, which provides the mirror with a greater degree of freedom from glare.

(ii) The mirror has a high visibility level.

As described above in (i), the reflectance of the mirror may be reduced in order to provide it with a greater degree of freedom from glare, but this results in the mirror having a lower visibility level. The visibility of a mirror increases as its reflectance increases. As FIGS. 6 to 15 show, the mirror of the present invention has a low reflectance in the range of wavelengths where a greater degree of freedom from glare is ensured, but in the other wavelength range, it has a sufficiently high reflectance to assure a superior visibility level.

In addition to these favorable reflectance properties, the mirror of the present invention is characterized by good color contrast, which contributes to a further improvement in the visibility offered by the mirror. The three primary colors, blue, green and red, have wavelengths of 400 to 480 nm, 490 to 580 nm and 590 to 700 nm, respectively. In terms of brightness, the visual sensation (stimulus to the eye) is small in the blue and red regions, as is clear from curve (1) in FIG. 5. The mirror of the present invention is designed so that it has a lower reflectance in the green region (where a stronger visual sensation occurs in terms of brightness) than in the blue and red regions, thereby "sensitizing" these low-brightness colors to provide an improved color contrast, and hence a further increase in visibility level.

(iii) The mirror is also improved in terms of aesthetic aspects.

As a result of the aforementioned improvements in the degree of freedom from glare and the level of visibility, the reflector mirror of the present invention produces reflected light having a somewhat magenta hue. This magenta hue imparts a perception of high quality to the mirror, and there enabling it to be clearly differentiated from other mirrors on the market.

(iv) The mirror blocks deleterious wavelengths of light.

Figure 16:
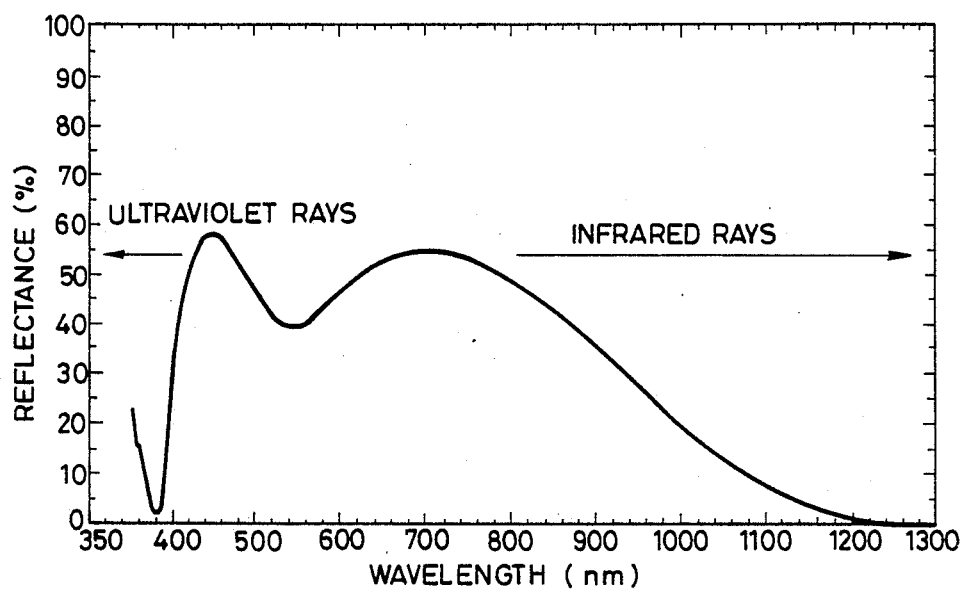

FIGS. 6 to 15 show the spectral reflection characteristics of the mirror of the present invention in the wavelength range of 300 to 750 nm. The spectral reflection characteristics of the same mirror over the wavelength range extended to 1300 nm are shown in FIG. 16, from which one can see that the mirror of the present invention has the additional advantage of inhibiting and blocking the reflection of unwanted and deleterious light such as ultraviolet and infrared radiation.

I claim:

1. A multi-layered mirror comprising:
   a substrate made of one of glass and transparent plastic;
   a dielectric multi-layered coating disposed on the front side of said substrate; and
   a light-absorbing layer formed on the backside of said substrate,
   said dielectric multi-layered coating comprising three to six dielectric layers laminated one on top of another and having alternately differing refractive indices, one of said dielectric layers being one of a single high-refractive index layer and single low-refractive index layer having an optical thickness of $\lambda_0/2$, where $\lambda_0$ is a wavelength of light used as a reference measurement for design purposes, and each of the remaining layers has an optical thickness of $\lambda_0/4$.

2. A multi-layered mirror according to claim 1, wherein said three to six layers are selected from L, H, 2L and 2H layers, wherein said H layer is a layer made of a material having a high refractive index of 1.9 to 2.4 and an optical thickness of $\lambda_0/4$, said 2H layer is made of a material having a high refractive index of 1.9 to 2.4 and an optical thickness of $\lambda_0/2$, said L layer is made of a material having a low refractive index of 1.3 to 1.8 and an optical thickness of $\lambda_0/4$, and said 2L layer is made of a material having a low refractive index of 1.3 to 1.8 and an optical thickness of $\lambda_0/2$.

3. A multi-layered mirror according to claim 2, wherein said dielectric multi-layered coating is composed of three dielectric layers.

4. A multi-layered mirror according to claim 3, wherein said dielectric multi-layered coating comprises: a plurality of dielectric layers formed on a front side of said substrate in the order from the substrate side, of a 2H layer, an L layer and an H layer.

5. A multi-layered mirror according to claim 3, wherein said dielectric multi-layered coating comprises: a plurality of dielectric layers formed on a front side of said substrate in the order from the substrate side, of an H layer, an L layer and a 2H layer.

6. A multi-layered mirror according to claim 2, wherein said dielectric multi-layered coating consists of four dielectric layers.

7. A multi-layered mirror according to claim 6, wherein said dielectric multi-layered coating consists of dielectric layers formed on the front side of the transparent substrate in the order from the substrate side, of an L layer, a 2H layer, an L layer and an H layer.

8. A multi-layered mirror according to claim 6, wherein said dielectric multi-layered coating consists of dielectric layers formed on the front side of the transparent substrate in the order from the substrate side, of a 2L layer, a 2H layer, an L layer and an H layer.

9. A multi-layered mirror according to claim 6, wherein said dielectric multi-layered coating consists of dielectric layers formed on the front side of the transparent substrate in the order from the substrate side, of an L layer, an H layer, an L layer and a 2H layer.

10. A multi-layered mirror according to claim 2, wherein said dielectric multi-layered coating consists of five dielectric layers.

11. A multi-layered mirror according to claim 10, wherein said dielectric multi-layered coating consists of dielectric layers formed on the front side of said transparent substrate in the order from the substrate side, of a 2H layer, an L layer, an H layer, an L layer and an H layer.

12. A multi-layered mirror according to claim 10, wherein said dielectric multi-layered coating consists of dielectric layers formed on the front side of said transparent substrate in the order from the substrate side, of an H layer, a 2L layer, an H layer, an L layer and an H layer.

13. A multi-layered mirror according to claim 10, wherein said dielectric multi-layered coating consists of dielectric layers formed on the front side of said transparent substrate in the order from the substrate side, of an H layer, an L layer, an H layer, an L layer and a 2H layer.

14. A multi-layered mirror according to any one of claims 4, 5 or 7–13, wherein said 2H layer comprises a pair of H layers.

15. A multi-layered mirror according to any one of claims 7 to 9 and 11 to 13, wherein said 2L layer comprises a pair of L layers.

16. A multi-layered mirror comprising:
a substrate made of one of glass and transparent plastic;
a dielectric multi-layered coating disposed on the front side of said substrate; and
a light-absorbing layer formed on the backside of said substrate,
said dielectric multi-layered coating comprising three to six dielectric layers laminated one on top of another and having alternately differing refractive indices, one of said dielectric layers being a single high-refractive index layer and another layer being a single low-refractive index layer, said high-refractive index layer and said low-refractive index layer both having an optical thickness of $\lambda_0/2$, where $\lambda_0$ is a wavelength of light used as a reference measurement for design purposes, and each of the remaining layers has an optical thickness of $\lambda_0/4$.

* * * * *